Inventor
RAYMOND RAVENEL
By Wenderoth, Lind & Ponack,
Attorneys

July 28, 1970    R. RAVENEL    3,521,729
HYDROSTATIC RETARDERS FOR ROAD VEHICLES
Filed Sept. 3, 1968    4 Sheets-Sheet 3

Inventor
RAYMOND RAVENEL
By Wenderoth, Lind & Ponack,
Attorneys

July 28, 1970   R. RAVENEL   3,521,729
HYDROSTATIC RETARDERS FOR ROAD VEHICLES
Filed Sept. 3, 1968   4 Sheets-Sheet 4
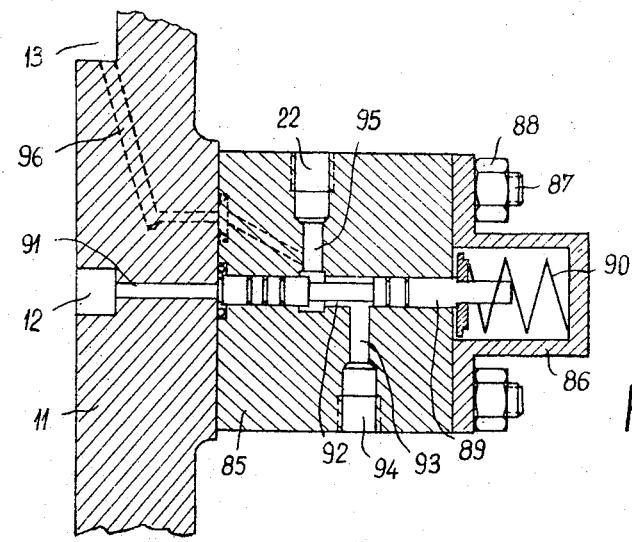
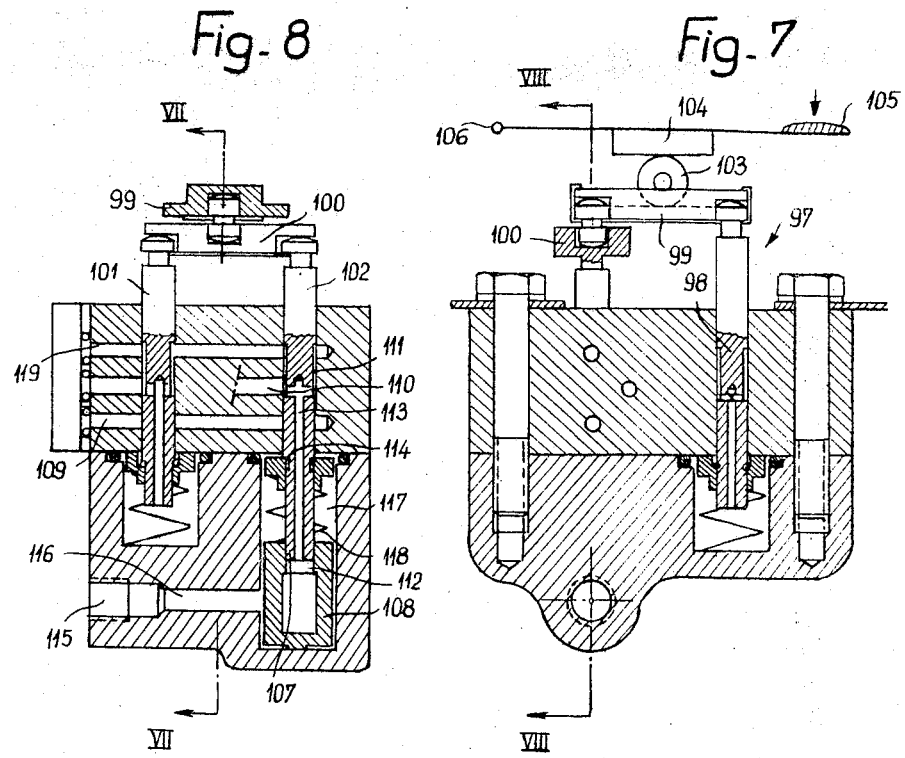
Inventor
RAYMOND RAVENEL
By Wendworth, Lind & Ponack,
Attorneys United States Patent Office 3,521,729
Patented July 28, 1970

3,521,729
HYDROSTATIC RETARDERS FOR ROAD VEHICLES
Raymond Ravenel, Paris, France, assignor to Société Anonyme Andre Citroen, Paris, France
Filed Sept. 3, 1968, Ser. No. 756,952
Claims priority, application France, Sept. 19, 1967, 121,486
Int. Cl. F16d 57/06
U.S. Cl. 188—91                          9 Claims

ABSTRACT OF THE DISCLOSURE

Hydrostatic retarder for a road vehicle having an engine controlled by an accelerator pedal and a transmission shaft driven by the engine. Mechanical brakes are provided on the vehicle front and rear axles having a pressure fluid control device. Control means are combined with the mechanical brakes control device. A barrel-type volumetric pump has cylinders rotatably driven by the transmission shaft and the pump has an impeller disk balanced by a hydrostatic abutment responsive to the delivery pressure of the pump. A timing plate is provided for setting and delivery. A low pressure over-feed pump is driven from the transmission shaft. There is a cooling radiator. Distribution members for the low pressure over-feed pump have a gauge valve to limit the delivery pressure of said over-feed pump and a slide valve controlled by the vehicle engine accelerator for disconnecting the retarder through the gauge valve. Members are provided for adjusting the delivery pressure of the retarder comprising a braking valve and a braking pressure limiter. A device disconnects the retarder and a braking distributor adjusts braking repartition between the retarder and the mechanical brakes.

---

The present invention relates to a hydrostatic retarder for road vehicles, of the type having its control system coupled with that of the mechanical brakes of the vehicle.

It is known that friction-type mechanical brakes as generally used on road vehicles are devices designed for converting an input energy into heat. When these brakes are to produce a retarding action, they become overheated and wear up at a relatively fast rate. Hence the requirement, especially for heavy vehicles driven down pronounced grades, of relieving the action of mechanical brakes.

It is already known to use to this end a hydrokinetic brake having its action combined with that of the mechanical brakes of the vehicles. This hydrokinetic brake comprises as a rule a turbine having its rotor rotatably coupled to the propeller shaft of the vehicle, this turbine being supplied with fluid from a turbo-pump. This brake, of which the capacity is completely proportional to the vehicle speed, is objectionable in that its efficiency at low speeds is questionable, so that a substantial fraction of the braking effort is devolved to the mechanical brakes. Moreover, relatively complicated control members are associated with this compound system for properly distributing or apportioning the braking action among the hydrokinetic brake and the mechanical brakes.

It is the object of the present invention to provide a hydrostatic retarder of simple design, which permits of avoiding the inconveniences of known hydrokinetic brake systems, its hydraulic energy being transformed into heat or mechanical energy, the retarding action produced thereby having a constant torque independent of the velocity of rotation of the transmission shaft as long as the hydraulic pressure is effective, and giving a deceleration inferior to that provided by the mechanical brakes with which it co-acts, and which adds its action to that of the mechanical brakes of the driving rear axle of the vehicle, said last-named brakes being operative only when the limit-capacity of the retarder capacity is overstepped.

An object of the invention is to provide a hydrostatic retarder for a road vehicle having an engine controlled by an accelerator pedal and a transmission shaft driven by the engine. Mechanical brakes are provided on the vehicle front and rear axles having a pressure fluid control device. Control means are combined with the mechanical brakes control device. A barrel-type volumetric pump has cylinders rotatably driven by the transmission shaft and the pump has an impeller disk balanced by a hydrostatic abutment responsive to the delivery pressure of the pump. A timing plate is provided for setting and delivery. A low pressure over-feed pump is driven from the transmission shaft. There is a cooling radiator. Distribution members for the low pressure over-feed pump have a gauge valve to limit the delivery pressure of said over-feed pump and a slide valve controlled by the vehicle engine accelerator for disconnecting the retarder through the gauge valve. Members are provided for adjusting the delivery pressure of the retarder comprising a braking valve and a braking pressure limiter. A device disconnects the retarder and a braking distributor adjusts braking repartition between the retarder and the mechanical brakes.

Other features of the invention will appear as the following description proceeds with reference to a specific form of embodiment of the hydrostatic retarder of this invention which is described hereinafter by way of example with reference to the attached drawing, in which:

FIG. 6 is a complementary section taken along the line VI—VI of FIG. 2, showing the slide valve controlling the disconnection of the retarder;

FIG. 7 illustrates a three-way brake distributor shown in section taken along the line VII—VII of FIG. 8; and FIG. 8 is a section taken along the line VIII—VIII of FIG. 7.

Figure 1:
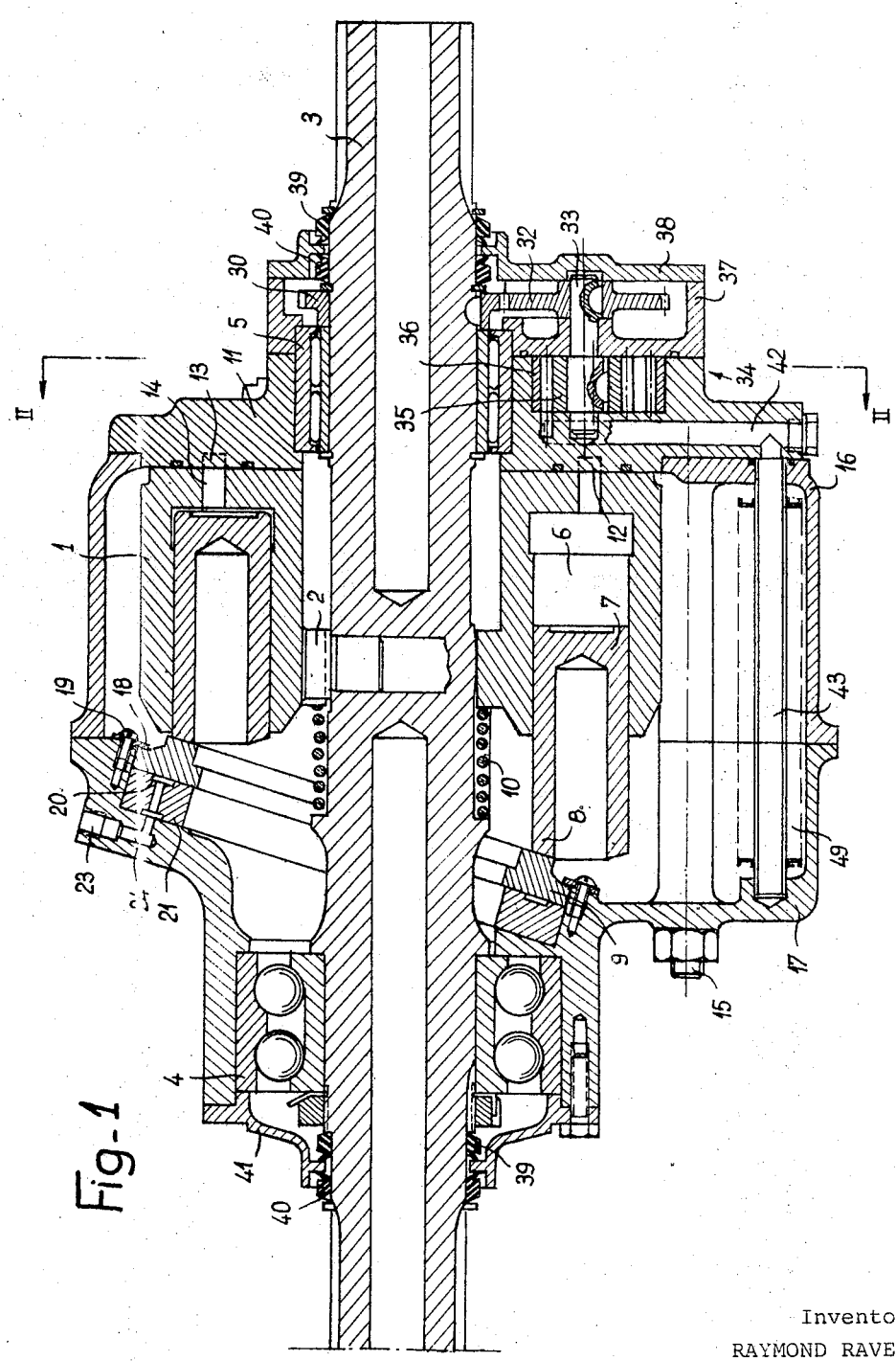
FIG. 1 shows in axial section the retarder of this invention.
Figure 2:
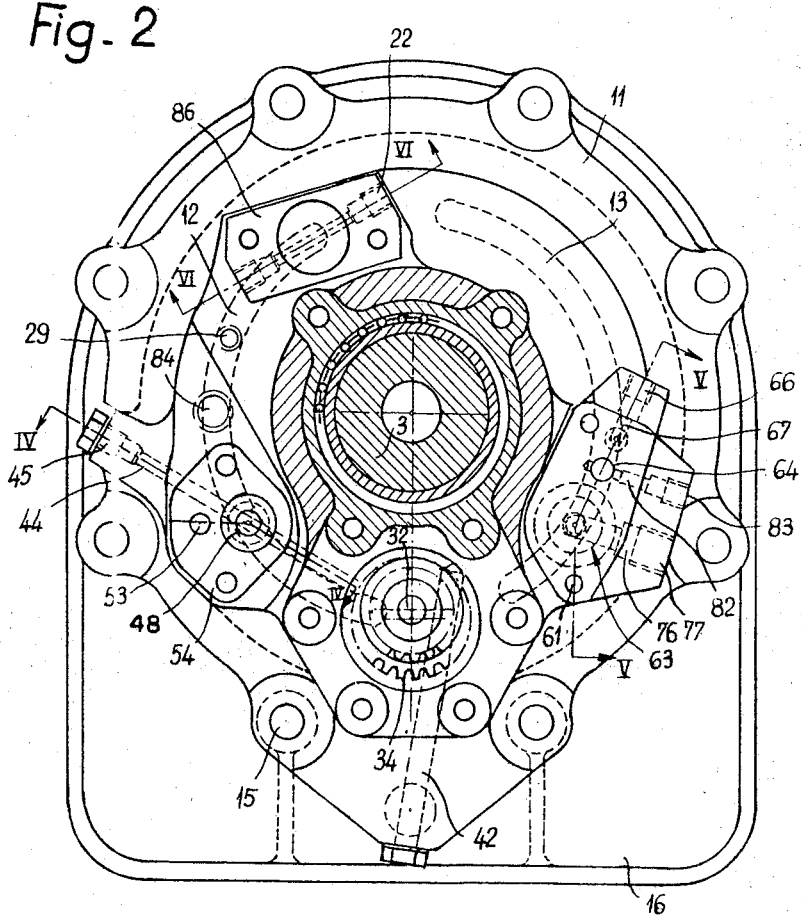
FIG. 2 is a cross-section taken along the line II—II of FIG. 1.
Figure 3:
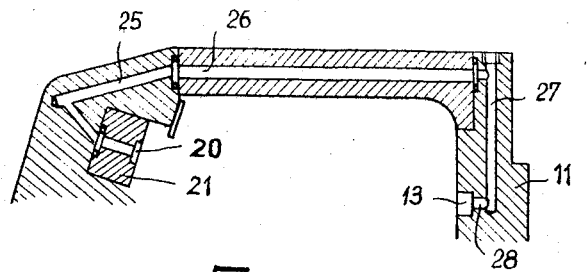
FIG. 3 shows on a larger scale the connection between the abutment of the impeller disk and the barrel-pump distributor.

Referring to FIGS. 1 and 2, it will be seen that the retarder constituting the subject-matter of this invention comprises essentially a barrel pump consisting of a cylindrical body rotatably secured through connecting means 2 to the transmission shaft 3 mounted in rolling-contact bearings 4 and 5. This body 1 comprises a number of cylindrical bores 6 distributed along a circumference, said bores having slidably mounted therein as many pistons 7 bearing through their rods 8 against an inclined impeller disk 9. A spring 10 constantly urges the body 1 against a timing plate 11 having formed, on its face registering with the barrel, suction ports 12 and delivery ports 13 disposed along a circular arc and shown in dash lines in FIG. 2. Each barrel bore comprises an axial end hole 14 adapted to cause the relevant cylinder having a bore 6 to communicate alternately with the suction port and the delivery port, the corresponding piston 7 performing one stroke every half-revolution of the cylinder. The timing plate 11 is secured by means of screw-threaded rods 15 to the pump case sections 16 and 17.

The frictional engagement between the piston rods 8 and the impeller disk 9 secured to the case section 17 by means of plates 18 and screws 19, drives the disk by causing same to slide on a hydrostatic abutment 20 formed on a stationary ring 21. This abutment comprises two pressure zones, i.e. a first pressure zone connected to the high braking pressure side of the barrel pump, and another pressure zone connected to a low full-feed pressure source, whereby the effort exerted by the pistons 7 is balanced. The high-pressure connection of the aforesaid abutment may be obtained for example by using an external pipe disposed between a union screwed at 22 in the body of the retarder disconnecting device illustrated in FIGS. 2 and 6, and another union screwed at 23 in the pump case section 17 and connected by a passage 24 to the aforesaid annular abutment 20, as shown in FIG. 1. Alternately, this connection may be obtained by drilling passages 25, 26, and 27, 28 respectively in the case sections 16, 17 and in the timing plate 11, these passages thus connecting the delivery port 13 of plate 11 to the hydrostatic abutment 20. The low pressure connection is established in a similar manner between the abutment and an outlet 29 of suction port 12, as shown in FIG. 2.

To obtain the full-feed pressure, a toothed wheel 30 rigid with the transmission shaft 3 and engaging the inner race of a rolling-contact or needle bearing 5 thereof drives a pinion 32 solid with the shaft 33 of a low-pressure pump 34, for example of the gear type, housed in the timing plate 11 and comprising a pinion 35 keyed on shaft 33 and driving an internally-toothed ring 36. A case 37 encloses the pump driving gears 30, 32 and acts as a bearing to its shaft 33. An outer flange 38 closes this case 37 and carries the packings 39, 40 of shaft 3. On the opposite end of the retarder another flange 41 closes the case section 17 and carries likewise shaft packings 39, 40.

A first duct 42 formed in the timing plate 11 connects the low-pressure pump 34 to a suction duct 43 of the retarder case. Another duct 44 connects the pump to an output union 45 connected in turn and externally to the retarder disconnecting device. This device is shown in greater detail in FIG. 6 and will be dealt with presently. The duct 44 is connected via other ducts 46 and 47 respectively to the suction port 12 and to a gage valve 48 secured to the timing plate 11 as shown in FIGS. 2 and 4, this valve adjusting the delivery pressure of pump 34.

The purpose of the over-feed pressure delivered by this pump is to automatically return the pistons 7 against the impeller disk 9 during the suction stroke of the barrel pump. Moreover, it compensates the leakages sucked by the pump 34 in the case through a filter 49.

Figure 4:
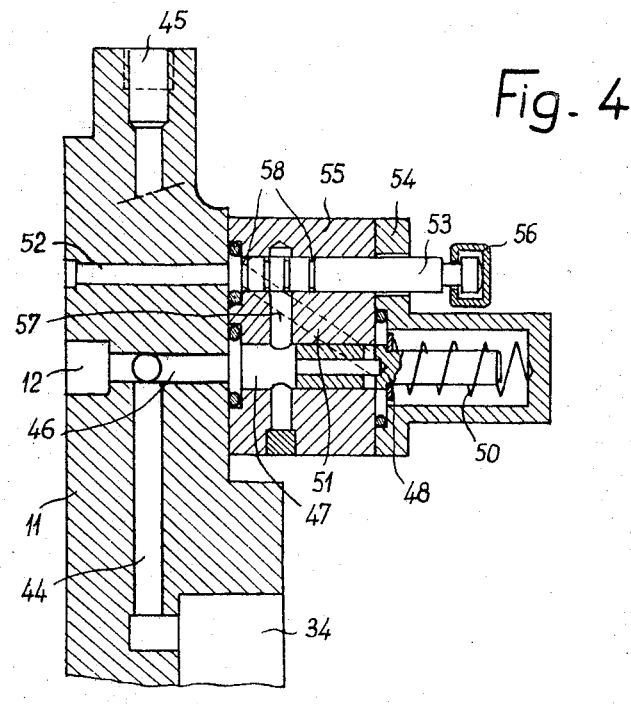
FIG. 4 is a section taken along the line IV—IV of FIG. 2, showing on a larger scale the low-pressure gage valve and the valve controlling the bringing into play of the braking action.

The gage valve 48 responsive to a calibration spring 50 on one side and to the pressure from duct 46 on the other side is adapted, when this last-named pressure exceeds a predetermined limit value, to open the port connected to the duct 51, whereby the excess fluid can flow back to the case via a duct 52 (FIG. 4).

When the over-feed pressure is removed the retarder is disconnected, since the pistons 7 are not returned against the impeller disk 9. To this end, a slide valve 53 for bringing the retarder into play is used, this valve 53 extending through the cover 54 of a valve body 55 common to this valve and to another slide valve 48 constituting a low-pressure gage valve connected to the accelerator pedal 56 of the vehicle.

Each time the driver of the vehicle depresses this pedal 56 the slide valve 53 is moved to the right as seen in FIG. 4, thus opening the communication between the chamber 47 of the gage valve with the exhaust duct 52 via a passage 57 formed in the body 55 communicating with said chamber 47 and also with the chamber 58 of slide valve 53, so as to by-pass the gage valve 48.

On the other hand, each time the driver releases the accelerator pedal, the slide valve 53 moves to the left (as seen in FIG. 4), thus closing the port of duct 57. The gage valve 48 will then deliver the over-feed pressure and the retarder will become operative by delivering the fluid under a pressure corresponding only to the loss of pressure of the circuit as long as the brake pedal is not depressed by the driver. This loss of pressure may if desired be calculated to produce an action complementary to the braking action produced by the engine when coasting is indulged in. This effect is obtained by allowing the accelerator pedal to perform an additional movement but without being coupled to the throttle beyond the idling position. Therefore, this additional stroke corresponds to the bringing of the retarder into its operative or braking condition, and gives a lost-motion stroke for the throttle control when the driver begins to depress the accelerator pedal.

Figure 5:
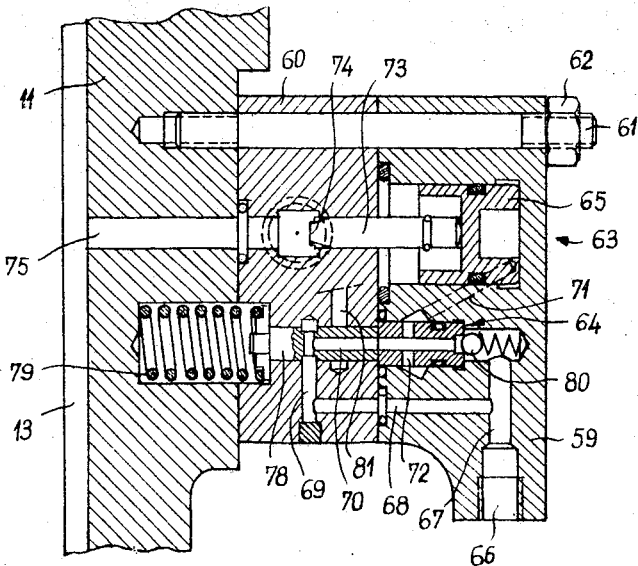
FIG. 5 is another section taken along the line V—V of FIG. 2 and showing on a larger scale the brake control valve and the brake pressure limiter.

As shown in FIGS. 2 and 5, the braking circuit comprises two bodies 59 and 60 secured by means of screw-threaded tie-rods 61 and nuts 62 to the timing plate 11 on the side provided with the delivery port 13, a brake valve 63 and a brake pressure limiter 64. The brake valve 63 comprises a piston and cylinder unit 65 responsive to the brake control pressure exerted thereon from a master cylinder of the braking system or from a distributor via a union 66 and ducts 67, 68, 69, 70 and 71, and the port 72. This pressure proportional to the braking pressure and therefore to the deceleration urges the valve 73 adjusting by means of its throttled orifice 74 the delivery pressure of the retarder and therefore the braking torque. The high-pressure fluid from the retarder is delivered from the duct 13 of timing plate 11 to a duct 75 and is subsequently directed from this duct 75 through another duct 76 and a union 77 to the inlet end of a cooling radiator (not shown).

The braking pressure limiter 64 comprises a valve 78 gaged by a spring 79; when the braking pressure from circuit 69 exceeds the gaged value of valve 78 the latter is urged against the resistance of spring 79, thus interrupting the communication between duct 69 and ducts 70, 71 and 72 connecting said duct 69 to the chamber or cylinder of the braking piston 65.

When the braking pressure in duct 69 is reduced to zero, the piston 65, as a consequence of the fluid-tightness of the control circuit, would not resume its abutment position shown in the drawing unless the leakages have reduced the pressure in this circuit. An instantaneous return of this piston is obtained by providing a non-return valve 80 causing the pressure in said circuit to drop while permitting an output directed to the duct 67 connected to duct 69, when the pressure in this duct 69 is again lower than that prevailing in the chamber containing the control piston 65.

A return duct 81 leading to the fluid reservoir (not shown) permits the backward movement of the aforesaid piston 65 by limiting the pressure in the chamber of this piston to a safety value greater than the gauged pressure. The control pressure in ducts 67 and 69 may actually build up more rapidly than the high pressure of the retarder, thus causing an excessive inward movement of slide valve 73. The backward movement of this slide valve and also of piston 65 would not be possible as long as the control pressure is greater than the pressure in the piston chamber, the non-return valve 80 being inoperative in this case. The duct 81 is connected via a duct 82 to a union 83 connected in turn to the reservoir (not shown).

The radiator dissipates in the surrounding atmosphere the heat produced by the throttling action in the brake valve 63; the oil volume in this radiator corresponds to the thermal inertia of the retarder. The fluid flows back from the radiator to the port 12 of timing plate 11 through a union 84.

This radiator may further be associated with a member for mechanically dissipating the hydraulic energy, for example a fan coupled to a hydraulic motor possibly operated from a power take-off located before the brake valve 63. Thus, one fraction of the retarding energy may be used for dissipating the heat to be removed. If desired, the fan may also be equipped with a flywheel so that it will continue to rotate a certain time after the brake application.

The low-pressure over-feed pump 34 being driven from the braked transmission shaft 3, its output is responsive to the velocity of rotation of this shaft. Under these conditions, at a certain time the output of this pump will exactly make up the leakages of the retarder circuit which are an increasing fraction of the delivery output pressure. This would cause the pistons 7 to slap against the impeller disk 9 at the end of a brake application. This inconvenience can be avoided by using a retarder disconnecting device adapted to become operative when the over-feed pressure drops below a predetermined value.

This device illustrated in FIGS. 2 and 6 comprises in a body 85 and an end cover 86 secured by studs 76 and nuts 88 to the timing plate 11, a slide valve 89 responsive on one side to the action of a spring 90 and connected on the other side through a duct 91 to the inlet port 12 of the distributor. An annular space 92 surrounding the central portion of slide valve 89 is connected via a duct 93 and union 94 to the union 45 and duct 44 from pump 34, through an external pipe (not shown). The annular space 92 is further connected via a duct 95 to another duct 96 connecting same to the delivery port 13 of the barrel pump.

When the delivery pressure of the low-pressure pump 34 drops below a predetermined value, the spring 90 moves the slide valve 89 to the position shown in the drawing; thus, the duct 96 connects the high-pressure delivery side wholly or partially to the low-pressure side through the duct and the retarder is thus disconnected wholly or partially, whereby its leakages depending on the delivery pressure remain lower than, or at the most equal to, the output of the full-feed pump 34.

The brake control system consists of a triple braking distributor 97 illustrated in FIGS. 7 and 8. This distributor actually comprises a first slide valve 98 controlling the mechanical brakes of the non-driving front axle and supporting a first rocker 99 adapted to actuate another rocker 100 disposed transversely to one end thereof and supported in turn by a pair of slide valves 101, 102 controlling respectively the retarder and the mechanical brakes of the driving rear axle of the vehicle. A braking force distributor comprising a roller 103 engaging a track 104 is provided for distributing the braking force as a function of the load carried by the rear axle, among the front brakes on the one hand and the rear brake and retarder assembly on the other hand. The track 104 is formed on a member rigid with the brake pedal 105 fulcrumed on a pin 106. The features and mode of operation of this braking-force distributor are disclosed in detail in the applicant's French Pat. No. 1,121,624.

The lower or inner end 107 of slide valve 102 controlling the mechanical brakes of the rear axle is movable in a blind cylinder 108 in which it is submitted to the reaction caused by the servo-pressure produced by the load fluid from the main hydraulic circuit via a duct 109, this fluid being directed to the rear axle brakes via duct 110, the circuit being through an external groove 111 of slide valve 102, chamber 112 of cylinder 108 and an axial duct 113 formed in said slide valve. This slide valve 102 is further responsive to the reaction exerted externally thereof on a shoulder-forming member 114 rigid therewith, as a consequence of the delivery pressure of the retarder which is applied through the union 115 and duct 116 to the interior of the distributor cylinder 117. A return spring 118 constantly urges the slide valve 102 for permanent engagement with the rocker 100.

The cross-sectional surface area receiving the reaction caused by the delivery pressure of the retarder is so calculated that the effort resulting therefrom balances the mechanical brake control effort as long as the braking capacity of the retarder is not overstepped. A return line 119 to the fluid reservoir permits the return flow of the mechanical brake control fluid through the aforesaid external groove 111 of slide valve 102.

When the vehicle is brought to a complete standstill and during the period in which the retarder is being disconnected, the mechanical brakes of the corresponding axle automatically substitute themselves for the retarder by exerting a braking action without requiring any change in the timing or distribution.

A hand-controlled reversing device (not shown) is provided for operating the device in two different manners: namely, the combined operation of the retarder and mechanical brakes, as illustrated in the drawing and explained hereinabove, and the operation of the retarder in its uncoupled or disconnected condition; in this last case the retarder control slide valve 101 of the triple distributor 97 delivers an inoperative working pressure; a separate manually-operated pressure-reducing valve adapted to be preset to all the values contemplated for this pressure within the limits of the braking capacity of the retarder will then adjust the retarder control pressure.

In either mode of operation the retarder will spare the mechanical brakes; it produces a constant-torque retarding action as long as its retarding pressure is maintained, independently of the velocity of rotation of the transmission shaft.

In the case of a combined operation (retarder+mechanical brake) the control means of the retarder are so designed that it is possible to cause the rear axle mechanical brakes to become operative only when the normal braking capacity of the retarder is overstepped, whereas the front axle brakes are constantly applied when the brake pedal is depressed.

In the case of a separate or disconnected operation of the system, with presetting of the braking coefficient of the retarder, two cases may arise:

(a) the braking effort demanded to the retarder is zero, as may be advantageous on a road surface affording a poor adherence of the vehicle wheels, so that braking the vehicle by applying the rear axle brakes constitutes an instability factor, the hydraulic distributor 97 controls only the mechanical brakes with a proper front-to-rear apportioning or distribution of the braking effort through the distributor 101 as a function of the vehicle load;

(b) the braking effort demanded to the retarder is not zero; in this case the distributor 97 will deliver through its slide valve 98 (controlling the front axle brakes) a braking fluid pressure proportional to the action exerted on the brake pedal, but delivers a pressure through the rear axle control slide valve 102 only when the braking capacity for which the retarder was preset is overstepped. This feature is advantageous in case of prolonged brake application on a road surface affording a good wheel adherence, for example when driving downhill in a mountainous country, for it permits a permanent operation of the retarder alone without operating the mechanical brakes otherwise than as make-up brakes.

I claim:

1. Hydrostatic retarder for a road vehicle having an engine controlled by an accelerator pedal, a transmission shaft driven by the engine, and mechanical brakes on the vehicle front and rear axles having a pressure fluid control device comprising control means combined with said mechanical brakes control device, a barrel-type volumetric pump having cylinders rotatably driven by said transmission shaft, said pump having an impeller disk balanced by a hydrostatic abutment responsive to the delivery pressure of said pump, a timing plate for setting and delivery, a low pressure over-feed pump driven from said transmission shaft, a cooling radiator, distribution members for said low-pressure over-feed pump comprising a gauge valve to limit the delivery pressure of said over-feed pump, a slide valve controlled by said vehicle engine accelerator for disconnecting the retarder through said gauge valve, members for adjusting the delivery pressure of the retarder comprising a braking valve and a braking pressure limiter, a device disconnecting the retarder and a braking distributor adjusting braking repartition between the retarder and said mechanical brakes.

2. Hydrostatic retarder according to claim 1, wherein said low pressure over-feed pump is disposed in said timing plate and connected to said gauge valve and through said timing plate to said impeller hydrostatic abutment.

3. Hydrostatic retarder according to claim 1, wherein said device for disconnecting the retarder comprises a slide valve actuated by said low-pressure over-feed pump, said slide valve causing the delivery circuit of the retarder to communicate partially or wholly with the low pressure circuit, thus disconnecting the retarder wholly or partially in proportion of said over-feed pressure.

4. Hydrostatic retarder according to claim 1, wherein said braking valve comprises a piston and cylinder unit responsive to said vehicle brakes control pressure, and a valve having a throttle for adjusting the delivery pressure of the fluid directed from the retarder to said cooling radiator, said valve being actuated by said piston and cylinder unit.

5. Hydrostatic retarder according to claim 4, wherein said braking pressure limiter comprises a valve adapted to close a duct feeding the piston and cylinder unit of said braking valve.

6. Hydrostatic retarder according to claim 4, comprising a hydraulic motor for driving a mechanical heat-dissipating member associated with said cooling radiator, and said braking valve body comprises ducts connected to the delivery circuit of said timing plate and a pressure take-off disposed before said braking valve to feed said hydraulic motor.

7. Hydrostatic retarder according to claim 1, wherein said braking distributor comprises a first slide valve controlling the mechanical brakes of the vehicle front axle, said first slide valve supporting a first rocker bearing upon another rocker carried by another slide valve controlling the retarder and a third slide valve controlling the vehicle rear axle mechanical brakes, said distributor distributing the braking effort among said slide valves.

8. Hydrostatic retarder according to claim 7, wherein said slide valve controlling the vehicle rear axle mechanical brakes is responsive to a difference between the reactions produced by the pressure exerted by the brake control fluid on the one hand and the delivery pressure of the retarder on the other hand, the ratio of the surface areas responsive to said reactions being such that the mechanical brakes are operated only in case the braking capacity of the retarder is overstepped.

9. Hydrostatic retarder according to claim 7, wherein a hand-controlled reversing device is provided for producing either a combined operation of the retarder and mechanical brakes, or a separate or disconnected operation of the retarder, a manually-operated pressure-reducing device being provided in this case for presetting the desired control pressures of the retarder.

References Cited

UNITED STATES PATENTS

| 2,847,938 | 8/1958 | Gondek | 103—162 X |
| 3,290,958 | 12/1966 | Bichaud | 188—91 X |
| 3,339,489 | 9/1967 | Mowbray | 103—162 X |

GEORGE E. A. HALVOSA, Primary Examiner